(12) United States Patent
Wright et al.

(10) Patent No.: US 8,395,641 B1
(45) Date of Patent: Mar. 12, 2013

(54) METHOD FOR INSERTING GRAPHIC ELEMENTS

(75) Inventors: Erik Lewis Wright, Outremont (CA); Vadim Berman, San Carlos, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/304,110

(22) Filed: Nov. 23, 2011

(51) Int. Cl.
*G09G 5/00* (2006.01)

(52) U.S. Cl. .................. 345/619; 345/620; 345/629

(58) Field of Classification Search .................. None
See application file for complete search history.

(56) References Cited

U.S. PATENT DOCUMENTS

| | | | |
|---|---|---|---|
| 7,626,537 B2 * | 12/2009 | Andrusiak et al. | 342/177 |
| 2002/0059610 A1 * | 5/2002 | Ellis | 725/58 |
| 2011/0320529 A1 * | 12/2011 | Mentchoukov et al. | 709/203 |

* cited by examiner

*Primary Examiner* — Joni Richer
*Assistant Examiner* — Michelle Chin
(74) *Attorney, Agent, or Firm* — Sterne, Kessler, Goldstein & Fox PLLC (57) ABSTRACT

Disclosed herein are methods and systems for injecting an existing graphic element into a target application. A sizing configuration of an existing graphic element displayed in a target application may be intercepted from a target application. A sizing configuration of the graphic elements which are to be injected may then be determined. Using the sizing configuration of the graphic elements to be injected and the intercepted sizing configuration of the existing graphic elements displayed in the target application, a resultant sizing configuration may be determined so that both the displayed existing graphic elements and the graphic elements to be injected may be displayed in the target application. The graphic elements which are to be injected may then be injected into the application so that both the graphic elements to be injected and the existing graphic elements are displayed in the target application.

29 Claims, 6 Drawing Sheets

METHOD FOR INSERTING GRAPHIC ELEMENTS

BACKGROUND

1. Field

Embodiments relate to graphical user interfaces.

2. Background

Software applications often have an accompanying graphical user interface (GUI) that allows a user to interact with the application in a visual manner. This often manifests itself as a series of windows, boxes, buttons, toolbars, and status bars displayed to the user. Generally these are programmed by a manufacturer or a developer in a manner that does not provide an interface that allows for the insertion of additional graphic elements. However, some software applications provide such an interface, which is referred to as plugin system.

A plugin or extension extends the functionality through the use of the plugin system. For example, several web browsers have plugin systems which allow for the creation of plugins. However, these plugin systems have a defined interface and often only allow limited modification of a web browser's GUI. For example, a plugin system might provide an interface to add a button to a toolbar, but might not permit for the creation of a status bar. Moreover, software applications that don't provide plugin systems may have no defined interface for extending functionality at all.

BRIEF SUMMARY

Embodiments include methods and systems for injecting graphic elements into a target application. In an embodiment, an existing graphic element sizing configuration of one or more existing graphic elements displayed in a target application is intercepted. An injectable graphic element sizing configuration of one or more injectable graphic elements is determined. A resultant sizing configuration is determined based upon the existing graphic element sizing configuration and the injectable graphic element sizing configuration, wherein the resultant sizing configuration permits the display of the one or more injectable graphic elements and the one or more existing graphic elements in the target application. The resultant sizing configuration is applied to the one or more existing graphic elements. The one or more injectable graphic elements are injected into the target application, wherein the one or more injectable graphic elements are displayed in the target application.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1A:
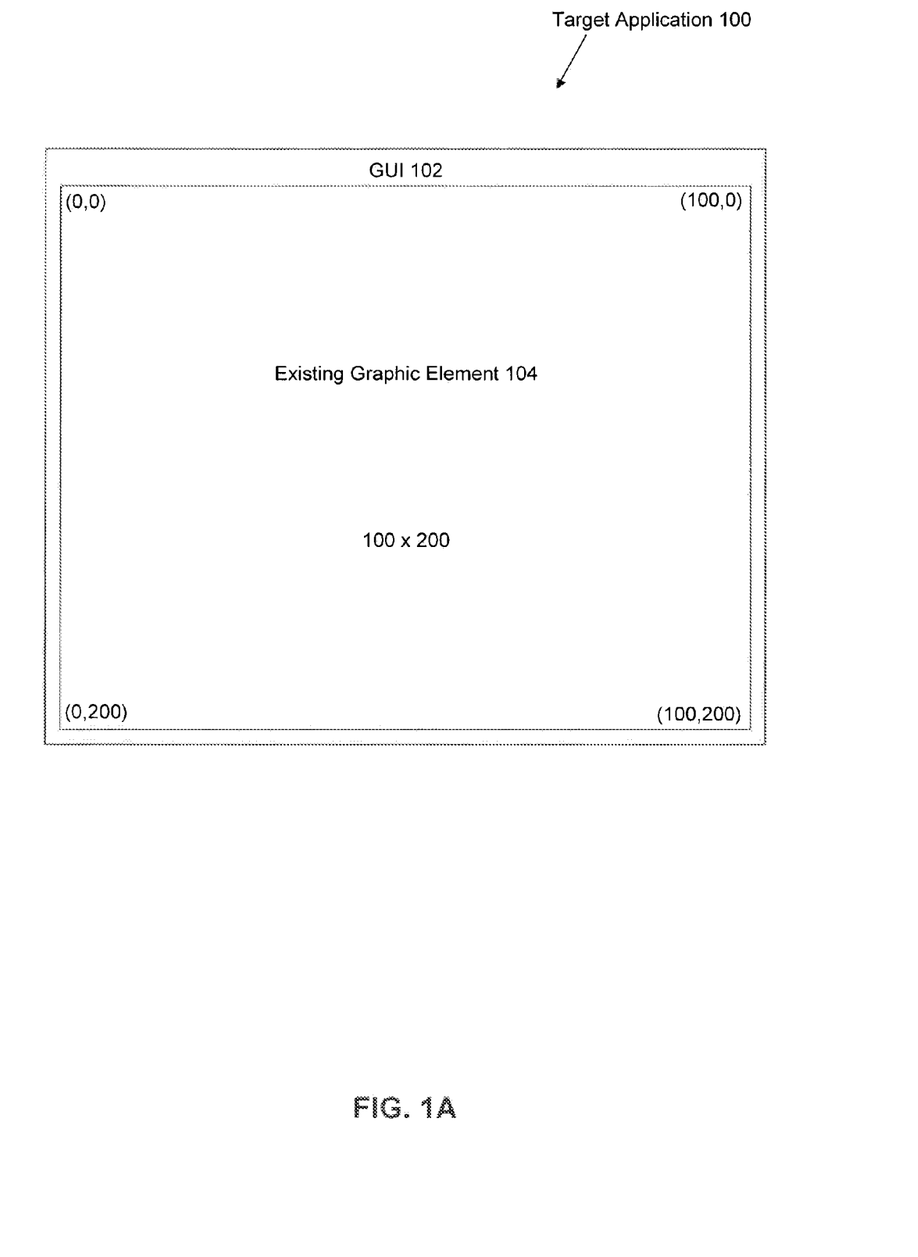
FIG. 1A is a diagram of a target application prior to the insertion of an injectable graphic element according to an embodiment.

FIG. 1A is a diagram of a target application prior to the insertion of an injectable graphic element according to an embodiment. Target application 100 includes a graphical user interface (GUI) 102 and an existing graphic element 104 displayed in GUI 102. GUI 102 may also include one or more existing graphic subelements or existing graphic element 104 may include one or more existing graphic subelements inside of it, or both.

Target application 100 may also include a coordinate-based positioning system for GUI 102. In a coordinate-based positioning system, graphical user interfaces may position individual existing graphic elements using a plurality of (x,y) coordinate pairs, wherein the x-value corresponds to a horizontal position and the y-value corresponds to a vertical position. These coordinate pairs may represent positions of individual pixels on a display.

In an example, target application 100 provides that the top left corner of existing graphic element 104 is positioned at coordinate pair (0, 0) and the bottom left corner is positioned at coordinate pair (0, 200). Thus, the height of existing graphic element 104 is 200 pixels. The top right corner of existing graphic element 104 is positioned at coordinate pair (100, 0) and the bottom right corner of existing graphic element 104 is positioned at coordinate pair (100, 200). Thus, the width of existing graphic element 104 is 100 pixels. In this example, existing graphic element 104 occupies the entirety of GUI 102. However, existing graphic element 104 may only partially occupy GUI 102, or a plurality of existing graphic elements may in totality occupy the entirety of GUI 102.

In either such a case, if an additional graphic element were to be inserted or injected in GUI 102, there may be no room to display the additional graphic element and existing graphic element 102. For example, if a graphic element such as a toolbar is inserted into GUI 102 in a conventional system, the inserted graphic element may have to be overlayed on top of existing graphic element 104, thereby blocking part of existing graphic element 104.

Figure 1B:
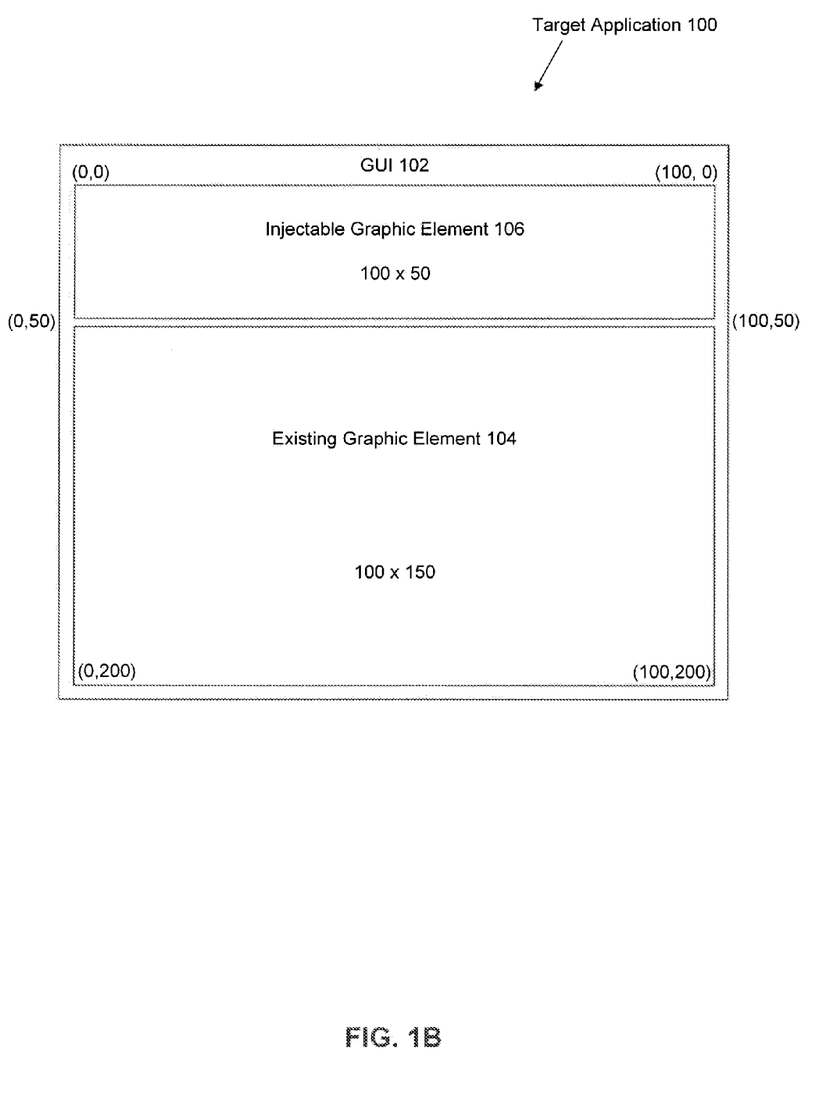
FIG. 1B is a diagram of a target application after an injectable graphic element has been inserted, according to an embodiment.

However, according to an embodiment an injectable graphic element may be inserted into a GUI which may not have additional space for the inserted element. FIG. 1B is a diagram of a target application after an injectable graphic element has been inserted, according to an embodiment.

In the example of FIG. 1B, injectable graphic element 106 is located above existing graphic element 104. However, injectable graphic element 106 may be located anywhere. For example, injectable graphic element 106 may be located above or below existing graphic element 104, or to the left or right of existing graphic element 104. Injectable graphic element 106 may also be injected at any point during target application's 100 execution. In the example of FIG. 1B, injectable graphic element 104 may be described by coordinates (0, 0) at the top left, (0, 50) at the bottom left, (100, 0) at the top right, and (100, 50) at the bottom right. Therefore, injectable graphic element 106 may have a height of 50 pixels and a width of 100 pixels. Thus, in order to insert injectable graphic element 106 into GUI 102, such that it is not overlayed, existing graphic element 104 may need to be resized.

For example, if injectable graphic element 106 is to be inserted above existing graphic element 104, existing graphic element's 104 height may need to be reduced, such that injectable graphic element 106 and existing graphic element 104 may be displayed concurrently. Thus, in order to insert injectable graphic element 106 above existing graphic element 104, existing graphic element's 104 height may be reduced from 200 pixels in height (depicted in FIG. 1A) to 150 pixels in height (depicted in FIG. 1B). This may permit injectable graphic element 106 and existing graphic element 104 to be displayed in target application 100.

Figure 2:
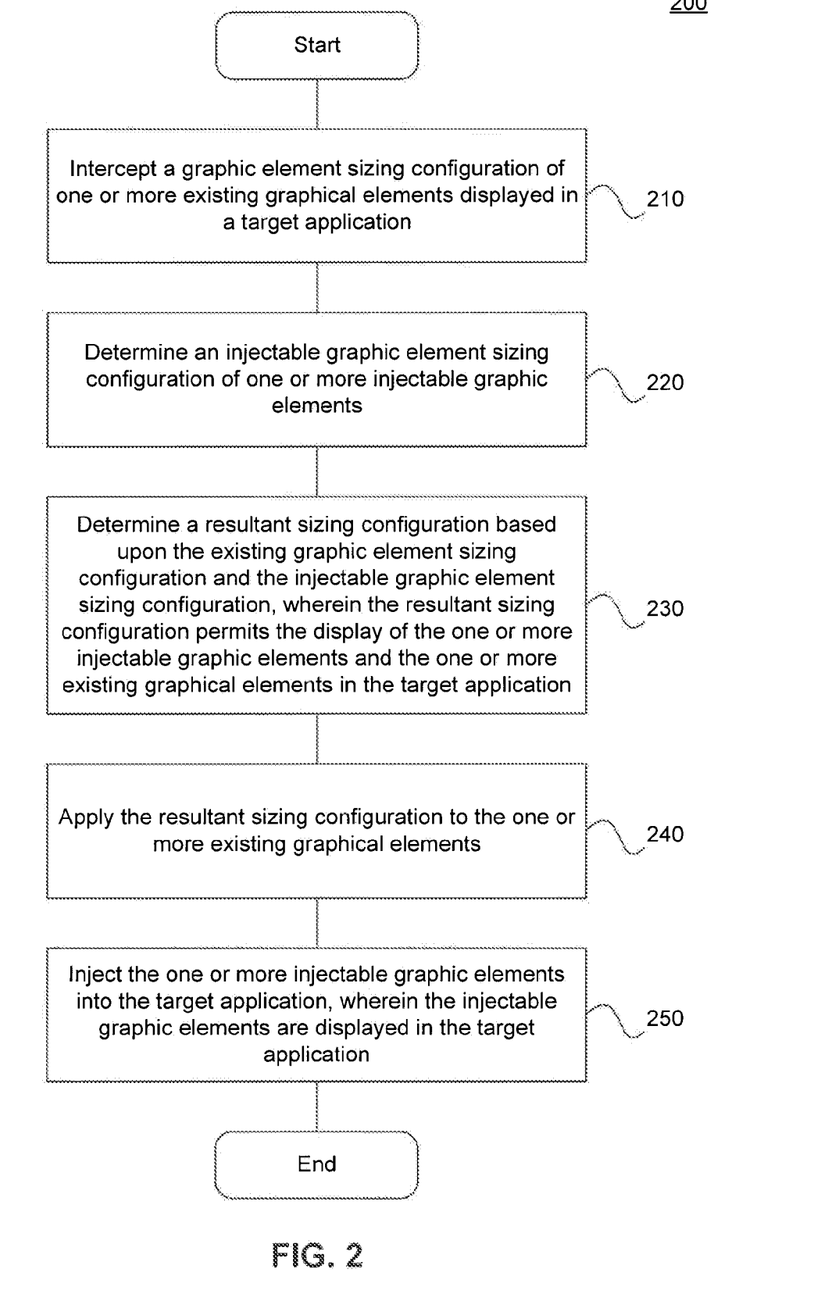
FIG. 2 is a flow diagram of a method for inserting an injectable graphic element into a target application's GUI according to an embodiment.

FIG. 2 is a flow diagram of a method 200 for inserting an injectable graphic element into a target application's GUI according to an embodiment. At block 210 of method 200, an existing graphic element sizing configuration of one or more existing graphic elements displayed in the GUI is intercepted. As discussed above, a target application's GUI may contain one or more existing graphic elements and those one or more existing graphic elements may also contain further graphic subelements. Furthermore, the target application's GUI may contain one or more injectable graphic elements and those one or more injectable graphic elements may also contain further injectable graphic subelements. Also, the injectable element may be inserted into the target application's GUI at any time during the target application's execution. Although the examples herein refer to a single injectable graphic element or a single existing graphic element, one having skill in the art would recognize that similar techniques can be used on more than one injectable graphic element, more than one existing graphic element, injectable graphic elements containing injectable subelements, or existing graphic elements containing graphic subelements.

A sizing configuration may describe the size and position of any type of graphic element. In particular, the existing graphic element sizing configuration may describe the size and position of an existing graphic element. An injectable graphic element sizing configuration may describe the size and position of an injectable graphic element. A sizing configuration may be fixed statically by a developer during the programming of the application, calculated based upon a variety of factors, or both. For example, a developer may fix the existing graphic element sizing configuration of an existing graphic element, such that the existing graphic element has a width of 100 and a height of 200 (as depicted in FIG. 1B). The developer may further fix the existing graphic element sizing configuration such that the top left corner of the existing graphic element is set to the coordinate of (0,0). However, in other cases, a sizing configuration may instead set the width and height of a graphic element dynamically based upon a variety of factors, such as whether a particular window is maximized or based upon other sizing configurations. A sizing configuration may also be fixed initially and then change subsequently based upon a variety of factors, such as whether a particular window is maximized. However, at any given time a particular sizing configuration describes the current size of its associated graphic element. A sizing configuration may also include coordinate points describing the size and position of a graphic element. However, a person having skill in the art would recognize a sizing configuration may also be described in other ways. For example, the sizing configuration may be described by a height and width, or a series of equations.

The existing graphic element sizing configuration may be intercepted in a variety of ways. For example, the existing graphic element sizing configuration may be intercepted by placing a hook at the operating system level through the use of an application-programming interface (API). A hook is a technique in which one piece of software is notified when another piece of software performs some event. However, despite whether a target application may provide for the placement of hooks, the operating system may provide for the placement of hooks in any application, for example target application 100 of FIG. 1. This may allow for the placement of hooks such that the hooks may receive events from any existing graphic element of any target application in the operating system. For example, a hook may be placed to intercept any combination of application resize events, initialization events, or destruction events. Additionally, prior to the insertion of an injectable graphic element, an event may be triggered causing the existing graphic element sizing configuration to be intercepted. This may allow for existing graphic element sizing configurations to be intercepted any time an injectable graphic element is to be inserted into the target application, as well as upon resize, initialization, and destruction of the target application.

The existing graphic element may be located in the target application by using a number of criteria or predicates that may be predefined or dynamically determined. For example, the existing graphic element may be located based upon searching for a graphic element that has a certain color and a certain size. However, the criteria may be based on any property that may be ascertained or calculated from a graphic element. The existing graphic element may also be located based upon dynamic criteria, such as actions taken by a user, a series of equations, conditions, or parameters. If an existing graphic element is not found based upon the criteria, one or more hooks may be placed in the target application to receive graphic element creation events. In such a case, once a graphic element is created that matches the criteria, that graphic element may be used as the existing graphic element. Additionally, if at any time, a destruction event from the existing graphic element is intercepted, another existing graphic element may be located that matches the predefined or dynamically determined criteria. In such a case, the newly matched existing graphic element may then be resized accordingly.

At block 220, an injectable graphic element sizing configuration of an injectable graphic element is determined. The sizing configuration of the injectable graphic element may be determined dynamically based upon the intended position of the injectable graphic element. For example, the injectable graphic element may be placed to the left or right of the existing graphic element. In such a case, the height of the injectable graphic element sizing configuration may equal the height of the existing graphic element, and the width may equal the current width of the injectable graphic element. However, the injectable graphic element may instead be placed to the top or bottom of the existing graphic element. In that case, the width of the injectable graphic element sizing configuration may equal the width of the existing graphic element, and the height may equal the current height of the injectable graphic element. Similar to the existing graphic element sizing configuration, the injectable graphic element sizing configuration may include coordinate points describing the size and position of the injectable graphic element. However, a person having ordinary skill in the art would recognize that the existing graphic element sizing configuration may also be described in other ways. A person having ordinary skill in the art would also recognize that neither the height nor the width of the injectable graphic element sizing configuration needs to match the respective sizes of the existing graphic element, but instead that the existing graphic element may surround in part or in whole the injectable graphic element.

At block 230, a resultant sizing configuration may be determined based upon the existing graphic element sizing configuration and the injectable graphic element sizing configuration, such that both the existing graphic element and the injectable graphic element are displayed in the target application. The resultant sizing configuration may be determined based upon the intended position of the injected element. For example, the injectable graphic element may be inserted above or below the existing graphic element. In such a case, the resultant sizing configuration may be determined by subtracting the injectable graphic element sizing configuration's height from the existing graphic element's sizing configuration's height. The width may be determined by the current width of the existing graphic element. As discussed above, the height of the existing graphic element and the injectable graphic element may be determined from coordinates which are stored in the existing graphic element sizing configuration and the injectable graphic element sizing configuration. However, the height may also be determined by a height value directly stored in the injectable graphic element sizing configuration, the existing graphic element sizing configuration, or both. The injectable graphic element may instead be inserted to the left or right of the existing graphic element. In such a case, the resultant element sizing configuration's width may be determined by subtracting the injected graphic element sizing configuration's width from the existing graphic element's sizing configuration's width. The width may be determined by the current sizing of the existing graphic element. The height of the existing graphic element and the injectable graphic element may be determined from coordinates which may be stored in the existing graphic element sizing configuration and the injectable graphic element sizing configuration. The height of the existing graphic element and the injectable graphic element may also be determined by a height value stored directly in the injectable graphic element sizing configuration, or the existing graphic element sizing configuration, or both.

In some cases, the height or the width of the target application's GUI may not be able to support the display of the injectable graphic element and the existing graphic element. For example, the existing graphic element may not be able to be resized beyond a certain point or at all, without being clipped. In such a case, the injectable graphic element is injected and the existing graphic element may be clipped in order to display the injectable graphic element. In another case, the target application's GUI may not be large enough to support the display of the entire injectable graphic element. In such a case, the injectable graphic element may be clipped in order to be displayed in the target application.

At block 240, the resultant sizing configuration is applied to the existing graphic element. This may occur by setting the sizing configuration of the existing graphic element to the resultant sizing configuration, thereby permitting the existing graphic element and the injectable graphic element to be displayed in the application. For example, in the case of the injectable graphic element being inserted above or below an existing graphic element, the resultant sizing configuration when applied to the existing graphic element may reduce the height of existing graphic element. If the injectable graphic element were to be inserted to the right or left of an existing graphic element, the resultant sizing configuration when applied to the existing graphic element, may reduce the width of existing graphic element.

At block 250, the injectable graphic element is injected into the application so that both the injectable graphic element and the existing graphic element may be displayed. Injection may occur by utilizing an operating system level API. Similar to the placement of hooks, despite whether a target application may provide for the addition of graphic elements, the operating system API may also allow for modification of any GUI of any target application. The GUI of the target application may be arranged in a hierarchical graphical user interface system. Under such an arrangement, the graphic elements may be stored in a parent-child or tree-like relationship. For example, if the existing graphic element contained further graphic subelements, those subelements would be children to the existing graphic element. An operating system level API may provide access to such a hierarchical tree, wherein the addition of elements may be permitted. Thus, the injectable graphic element may be injected by finding a parent existing graphic element of which the injectable graphic element is intended to be a child and inserting the injectable graphic element. This may then have the effect of displaying the injectable graphic element in a GUI of a target application, for example GUI 102.

Figure 3:
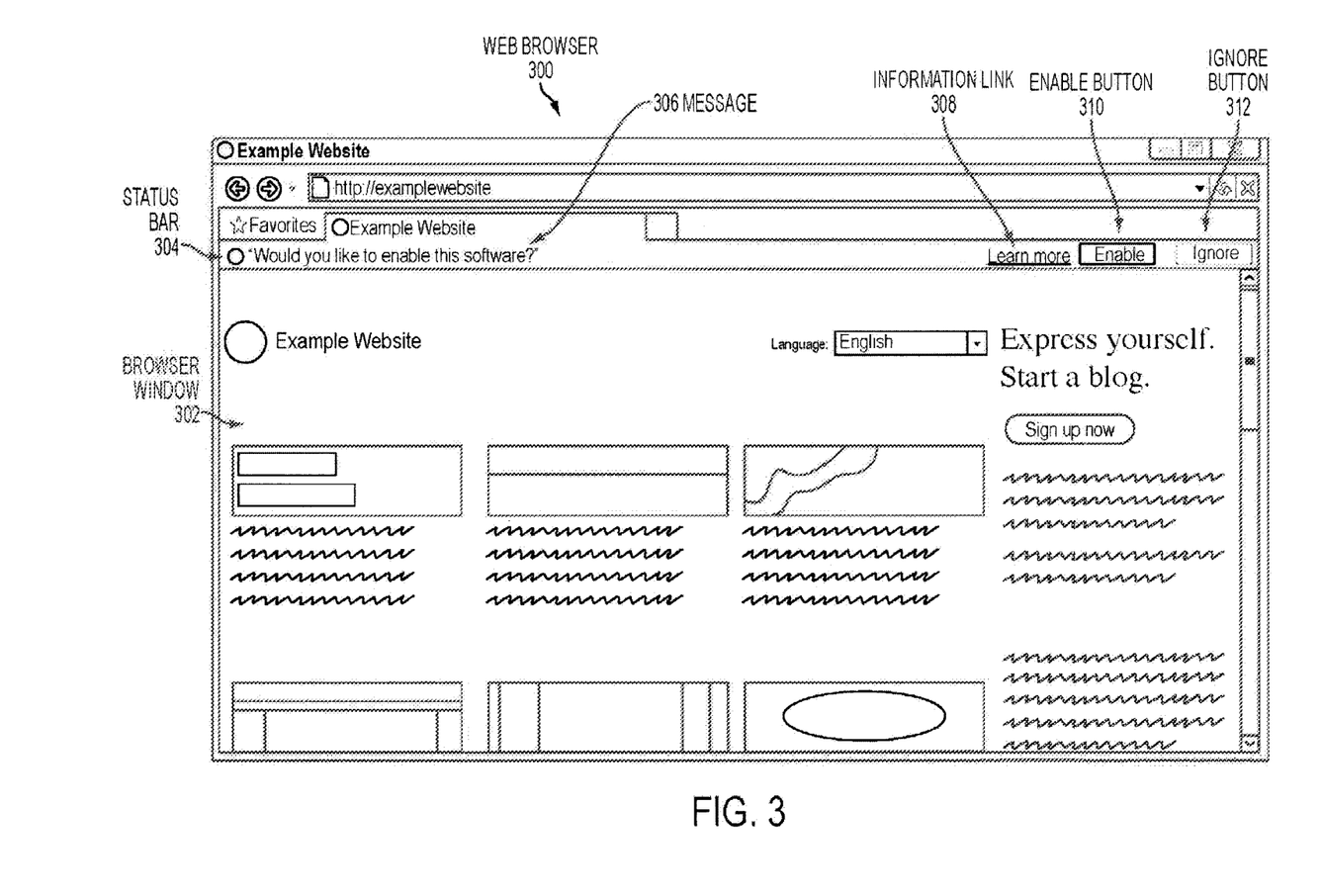
FIG. 3 is a diagram of an exemplary web browser after the insertion of a status bar, according to an embodiment.

FIG. 3 is a diagram of an example web browser after the insertion of a status bar, according to an embodiment. Web browser 300 includes a browser window 302 and a status bar 304. Browser window 302 may be an existing graphic element, for example existing graphic element 102, of FIGS. 1A-1B. Browser window 302 may also be configured to display web content such as HTML. Status bar 304 may be an injectable graphic element, for example injectable graphic element 106 of FIG. 1B. However, web browser 302 may not provide an API for inserting particular types of graphics elements, for example status bars. Thus, status bar 304 may need to be injected into web browser 300 in accordance with method 200. In particular, status bar 304 may be injected above browser window 302. As a result browser window 302 may be resized from its original position and size in accordance with method 200.

Status bar 304 contains additional graphic elements. In particular, status bar 304 includes a message 306, an information link 308, an enable button 310, and an ignore button 312. Message 306 may be displayed as text on status bar 304. However, message 306 may also be displayed as graphics or a combination of graphics and text on status bar 304. Accordingly, message 306 may include an informational message, which further explains the available actions a user may take.

For example the informational message of message 306 may be "would you like to enable this software?" Information link 308 may be a link to further information regarding the actions a user may take. For example, information link 308 may be a link to a website further explaining the software that may be enabled by enable button 310. The website may be displayed in browser window 302. Enable button 310, when pressed, may enable a particular software component. For example, enable button 310, when pressed, may enable a plugin. Ignore button 312, when pressed, may hide status bar 304, such that browser window 302 may be displayed in its original position and size.

Figure 4:
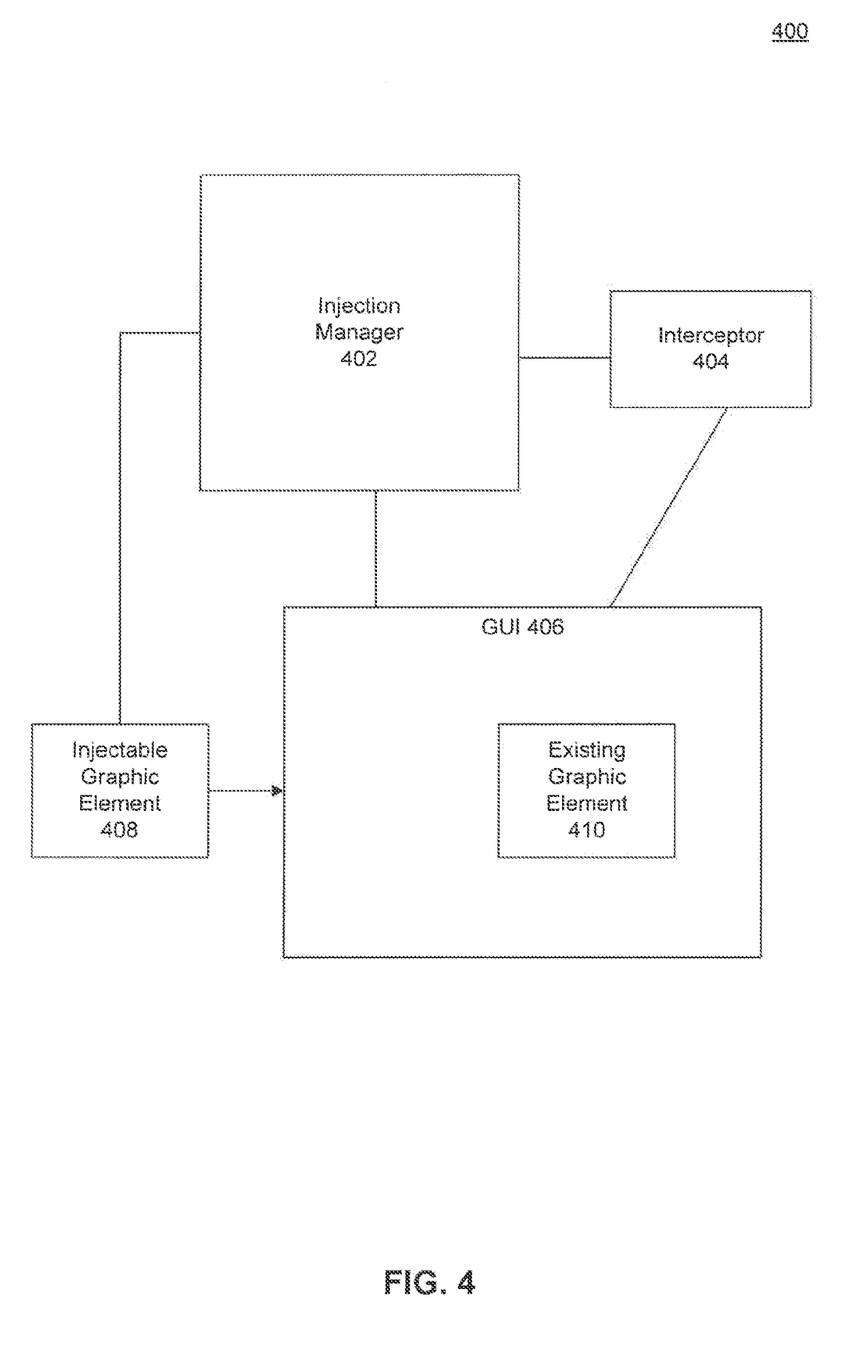
FIG. 4 is a block diagram of a system for injecting an injectable graphic element into a target application according to an embodiment.

FIG. 4 is a block diagram of a system 400 for injecting an injectable graphic element into a target application according to an embodiment. System 400 includes an injection manager 402, an interceptor 404, a GUI 406, and an injectable graphic element 408. GUI 406 further includes an existing graphic element 410. In order to insert injectable graphic element 408 into GUI 406, system 400 may use injection manager 402 and interceptor 404.

Interceptor 404 may be configured to intercept existing graphic element sizing configurations from existing graphic element 410. This may occur by placing hooks to intercept sizing, resizing, or destruction events from existing graphic element 410 using an operating system API. For example, upon initialization of GUI 406, existing graphic element 410 may be configured with a particular size. Interceptor 404 may intercept this particular size upon the initialization. Additionally, the size of existing graphic element 410 may change due to actions of a user. For example, the user may maximize the target application or resize the window. This may cause GUI 406 to automatically resize existing graphic element 410 to a new size. Accordingly, interceptor 404 may intercept the new existing graphic element sizing configuration of existing graphic element 410. Once the size of existing graphic element 410 has been intercepted, the injection manager may determine the appropriate size of injectable graphic element 408 and existing graphic element 410.

Injection manager 402 may be configured to locate existing graphic element 410 in GUI 406. Injection manager 402 may locate existing graphic element 410 by using a number of criteria or predicates that may be predefined or dynamically determined. For example, injection manager 402 may be pre-configured to look for an existing graphic element that has a certain color and a certain size. However, the criteria may be based on any property that may be ascertained or calculated from a graphic element. Injection manager 402 may then search the hierarchical graphic tree of GUI 406 until injection manager 402 finds a suitable graphic element. Injection manager 402 may also be configured to locate existing graphic element 410 based upon dynamic criteria, such as actions taken by a user, a series of equations, or conditions.

In some cases, a suitable graphic element may not be located. In such cases, one or more hooks may be installed in the parent graphic element, in which the injectable graphic element 408 may injected, which receive events related to the creation of child elements in the parent graphic element. Once a child graphic element is created that may be suitable based upon the criteria, the newly created child element may be used as the existing graphic element. Additionally, if at any time, a destruction event from existing graphic element 410 is received by interceptor 404, injection manager 402 may search for another existing graphic element that matches the predefined or dynamically determined criteria. In such a case, the newly matched existing graphic element may then be resized accordingly.

Injection manager 402 may also be configured to determine the appropriate size of injectable graphic element 408 and existing graphic element 410 in order to permit them both to be displayed in GUI 406. This may be accomplished in accordance with block 220 and block 230 of method 200. Thus, depending on the intended placement of injectable graphic element 408 and the position of existing graphic element 410, an appropriate size may be determined for injectable graphic element 408. Moreover, a resultant sizing configuration may be determined for existing graphic element 410 based upon the existing graphic element sizing configuration intercepted by interceptor 404 and the intended position of injectable graphic element 408. This resultant sizing configuration may then be applied to existing graphic element 410.

In some cases, the resultant sizing configuration may result in existing graphic element 410 being clipped. For example, in certain configurations, existing graphic element 410 may only permit resizing to a certain point, or not at all. In such a case, existing graphic element 410 may be clipped when injectable graphic element 408 is inserted. Injectable graphic element 408 may also be clipped in certain cases. For example, injectable graphic element 408 may be clipped, if GUI's 406 size is not large enough to support the display of injectable graphic element 408.

Additionally, injection manager 402 may be configured to inject an injectable graphic element 408 into GUI 406. The injection may occur by using an operating system level API in a hierarchical GUI system, in accordance with block 250, of method 200. Injection may occur at any time during the execution of GUI 406. Injection manager may also be configured to trigger an event causing interceptor 404 to receive an existing graphic element sizing configuration in response to a request to inject injectable graphic element 408. However, depending on the type of target application, the injection may also occur through the use of a plugin system or an extension.

Figure 5:
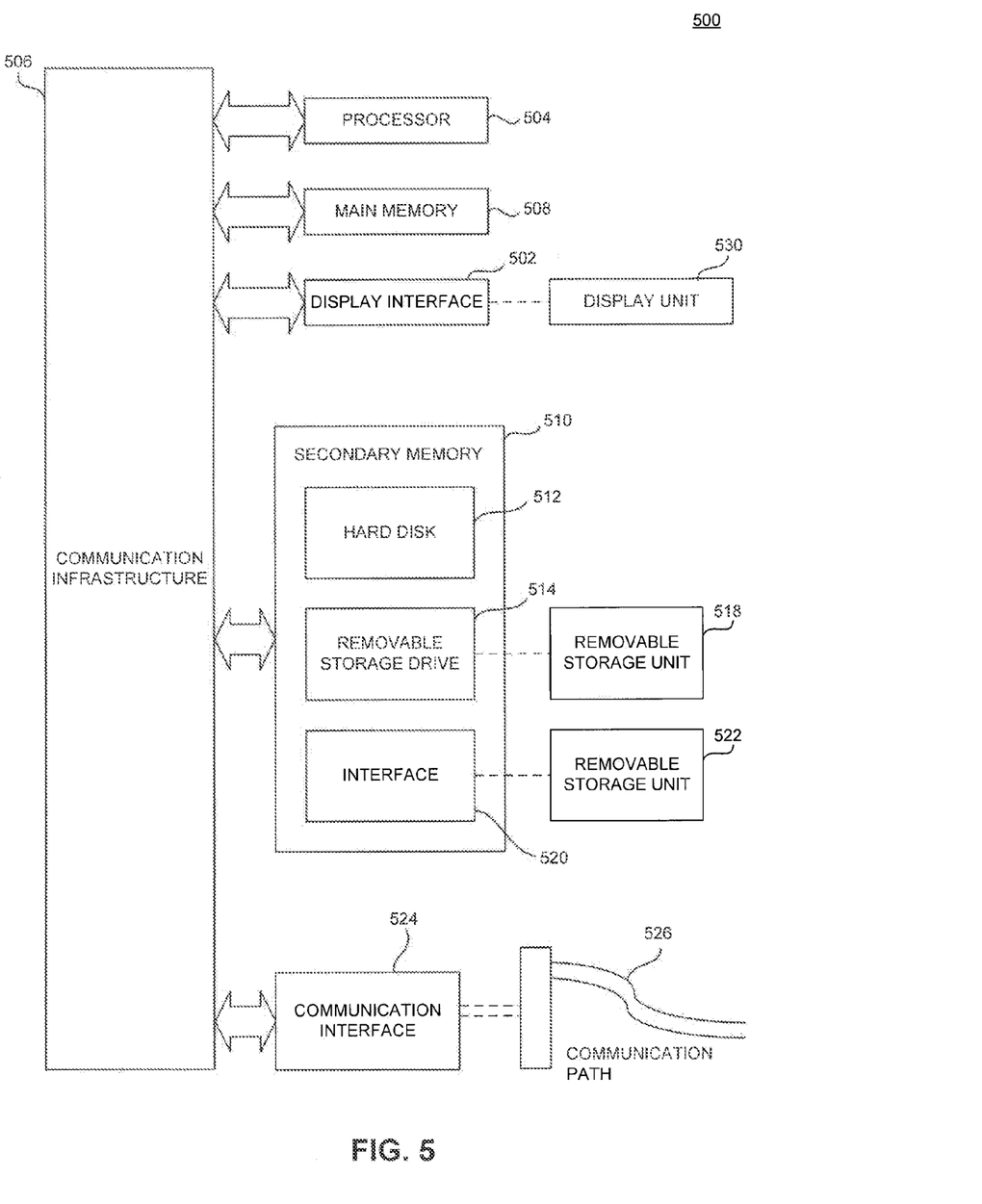
FIG. 5 illustrates an example computer system in which embodiments as described above, or portions thereof, may be implemented.

FIG. 5 illustrates an example computer system 500 in which embodiments as described above, or portions thereof, may be implemented. For example, system 400 or web browser 300, including portions thereof, may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules, procedures, and components in FIGS. 1-4.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512 and removable storage drive 514. Removable storage drive 514 may include a floppy disk drive, a magnetic tape drive, an optical disk drive, a flash memory, or the like. The removable storage drive 514 reads from and/or writes to a removable storage unit 518 in a well-known manner. Removable storage unit 518 may include a floppy disk, magnetic tape, optical disk, etc. which is read by and written to by removable storage drive 514. As will be appreciated by persons skilled in the relevant art, removable storage unit 518 includes a computer readable storage medium having stored thereon computer software and/or data.

Computer system 500 (optionally) includes a display interface 502 (which can include input and output devices such as keyboards, mice, etc.) that forwards graphics, text, and other data from communication infrastructure 506 (or from a frame buffer not shown) for display on display unit 530.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

Some embodiments may be directed to computer products comprising software stored on any computer readable medium. Such software, when executed in one or more data processing devices, causes a data processing device(s) to operate as described herein.

Certain embodiments may be implemented in hardware, software, firmware, or a combination thereof. Some embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A method for injecting existing graphic elements comprising:
    intercepting from a target application an existing graphic element sizing configuration of one or more existing graphic elements displayed in the target application;
    determining an injectable graphic element sizing configuration of one or more injectable graphic elements;
    determining a resultant sizing configuration based upon the existing graphic element sizing configuration and the injectable graphic element sizing configuration, wherein the resultant sizing configuration permits the display of the one or more injectable graphic elements and the one or more existing graphic elements in the target application;
    applying the resultant sizing configuration to the one or more existing graphic elements; and
    injecting the one or more injectable graphic elements into the target application using an application programming interface unrelated to the target application, wherein the one or more injectable graphic elements are displayed in the target application.

2. The method of claim 1, wherein the target application comprises a web browser.

3. The method of claim 1, wherein the one or more injectable graphic elements comprise a status bar.

4. The method of claim 1, wherein the existing graphic element sizing configuration comprises a plurality of coordinate points, the injectable graphic element sizing configuration comprises a plurality of coordinate points, and the resultant sizing configuration comprises a plurality of coordinate points.

5. The method of claim 1, wherein the determining the injectable graphic element sizing configuration further comprises:

determining a width of the injectable graphic element sizing configuration, wherein the width is equal to a width of the existing graphic element sizing configuration and the width of the injectable graphic element sizing configuration permits the display of the one or more injectable graphic elements and the one or more existing graphic elements in the target application; and determining a height of the injectable graphic element, wherein the height permits the display of the one or more injectable graphic elements and the one or more existing graphic elements in the target application.

6. The method of claim 1, wherein the determining the injectable graphic element sizing configuration further comprises:

determining a height of the injectable graphic element sizing configuration, wherein the height is equal to a height of the existing graphic element sizing configuration and the height of the injectable graphic element sizing configuration permits the display of the one or more injectable graphic elements and the one or more existing graphic elements in the target application; and determining a width of the injectable graphic element, wherein the width permits the display of the one or more injectable graphic elements and the one or more existing graphic elements in the target application.

7. The method of claim 1, wherein the determining the resultant sizing configuration further comprises:

determining a width of the resultant sizing configuration, wherein the width is equal to a width of the existing graphic element sizing configuration and the width of the resultant sizing configuration permits the display of the one or more injectable graphic elements and the one or more existing graphic elements in the target application; and determining a height of the resultant sizing configuration by subtracting a height of the injectable graphic element sizing configuration from a height of the existing graphic element sizing configuration, wherein the height of the resultant sizing configuration permits the display of the one or more injectable graphic elements and the one or more existing graphic elements in the target application.

8. The method of claim 1, wherein the determining the resultant sizing configuration further comprises:

determining a width of the resultant sizing configuration by subtracting a width of the injectable graphic element sizing configuration from a width of the existing graphic element sizing configuration, wherein the width of the resultant sizing configuration permits the display of the one or more injectable graphic elements and the one or more existing graphic elements in the target application; and determining a height of the resultant sizing configuration, wherein the height is equal to a height of the existing graphic element sizing configuration and the height of the resultant sizing configuration permits the display of the one or more injectable graphic elements and the one or more existing graphic elements in the target application.

9. The method of claim 1, wherein the intercepting the existing graphic element sizing configuration occurs in response to the target application receiving an initialization event.

10. The method of claim 1, wherein the intercepting the existing graphic element sizing configuration occurs in response to the target application receiving a resize event.

11. The method of claim 1, further comprising:

receiving a request to inject the one or more injectable graphic elements, wherein the intercepting the existing graphic element sizing configuration occurs in response the request to inject the one or more injectable graphic elements.

12. The method of claim 1, wherein the target application further comprises a hierarchical graphical user interface.

13. The method of claim 1, further comprising:

locating the one or more existing graphic elements based upon a criteria.

14. A computer readable storage medium having code stored thereon that, when executed by one or more processors, causes the one or more processors to perform operations including:

intercepting from a target application an existing graphic element sizing configuration of one or more existing graphic elements displayed in the target application;

determining an injectable graphic element sizing configuration of one or more injectable graphic elements;

determining a resultant sizing configuration based upon the existing graphic element sizing configuration and the injectable graphic element sizing configuration, wherein the resultant sizing configuration permits the display of the one or more injectable graphic elements and the one or more existing graphic elements in the target application;

applying the resultant sizing configuration to the one or more existing graphic elements; and injecting the one or more injectable graphic elements into the target application using an application programming interface unrelated to the target application, wherein the one or more injectable graphic elements are displayed in the target application.

15. The computer readable storage medium of claim 14, wherein the determining the injectable graphic element sizing configuration further comprises:

determining a width of the injectable graphic element sizing configuration, wherein the width is equal to a width of the existing graphic element sizing configuration and the width of the injectable graphic element sizing configuration permits the display of the one or more injectable graphic elements and the one or more existing graphic elements in the target application; and determining a height of the injectable graphic element, wherein the height permits the display of the one or more injectable graphic elements and the one or more existing graphic elements in the target application.

16. The computer readable storage medium of claim 14, wherein the determining the injectable graphic element sizing configuration further comprises:

determining a height of the injectable graphic element sizing configuration, wherein the height is equal to a height of the existing graphic element sizing configuration and the height of the injectable graphic element sizing configuration permits the display of the one or more injectable graphic elements and the one or more existing graphic elements in the target application; and determining a width of the injectable graphic element, wherein the width permits the display of the one or more injectable graphic elements and the one or more existing graphic elements in the target application.

17. The computer readable storage medium of claim 14, wherein the determining the resultant sizing configuration further comprises:

determining a width of the resultant sizing configuration, wherein the width is equal to a width of the existing graphic element sizing configuration and the width of the resultant sizing configuration permits the display of the one or more injectable graphic elements and the one or more existing graphic elements in the target application; and determining a height of the resultant sizing configuration by subtracting a height of the injectable graphic element sizing configuration from a height of the existing graphic element sizing configuration, wherein the height of the resultant sizing configuration permits the display of the one or more injectable graphic elements and the one or more existing graphic elements in the target application.

18. The computer readable storage medium of claim 14, wherein the determining the resultant sizing configuration further comprises:

determining a width of the resultant sizing configuration by subtracting a width of the injectable graphic element sizing configuration from a width of the existing graphic element sizing configuration, wherein the width of the resultant sizing configuration permits the display of the one or more injectable graphic elements and the one or more existing graphic elements in the target application; and determining a height of the resultant sizing configuration, wherein the height is equal to a height of the existing graphic element sizing configuration and the height of the resultant sizing configuration permits the display of the one or more injectable graphic elements and the one or more existing graphic elements in the target application.

19. The computer readable storage medium of claim 14, wherein the intercepting the existing graphic element sizing configuration occurs in response to the target application receiving an initialization event.

20. The computer readable storage medium of claim 14, wherein the intercepting the existing graphic element sizing configuration occurs in response to the target application receiving a resize event.

21. A system comprising:
a graphical user interface comprising one or more existing graphic elements displayed in the target application having an existing graphic element sizing configuration;
one or more injectable graphic elements having an injectable graphic element sizing configuration;
an interceptor module configured to intercept from the target application the existing graphic element sizing configuration; and
an injection manager configured to:
determine a resultant sizing configuration based upon the existing graphic element sizing configuration and the injectable graphic element sizing configuration, wherein the resultant sizing configuration permits the display of the one or more injectable graphic elements and the one or more existing graphic elements in the target application,
apply the resultant sizing configuration to the one or more existing graphic elements, and
inject the one or more injectable graphic elements into the target application using an application programming interface unrelated to the target application, wherein the one or more injectable graphic elements are displayed in the target application.

22. The system of claim 21, wherein the injection manager is implemented in a plugin system.

23. The system of claim 21, wherein the one or more injectable graphic elements comprise a status bar.

24. The system of claim 21, wherein the existing graphic element sizing configuration comprises a plurality of coordinate points, the injectable graphic element sizing configuration comprises a plurality of coordinate points, and the resultant sizing configuration comprises a plurality of coordinate points.

25. The system of claim 21, wherein the injection manager is further configured to determine the resultant sizing configuration by:

determining a width of the resultant sizing configuration, wherein the width is equal to a width of the existing graphic element sizing configuration and the width of the resultant sizing configuration permits the display of the one or more injectable graphic elements and the one or more existing graphic elements in the target application; and determining a height of the resultant sizing configuration by subtracting a height of the injectable graphic element sizing configuration from a height of the existing graphic element sizing configuration, wherein the height of the resultant sizing configuration permits the display of the one or more injectable graphic elements and the one or more existing graphic elements in the target application.

26. The system of claim 21, wherein the injection manager is further configured to determine the resultant sizing configuration by:

determining a width of the resultant sizing configuration by subtracting a width of the injectable graphic element sizing configuration from a width of the existing graphic element sizing configuration, wherein the width of the resultant sizing configuration permits the display of the one or more injectable graphic elements and the one or more existing graphic elements in the target application; and determining a height of the resultant sizing configuration, wherein the height is equal to a height of the existing graphic element sizing configuration and the height of the resultant sizing configuration permits the display of the one or more injectable graphic elements and the one or more existing graphic elements in the target application.

27. The system of claim 21, wherein the interceptor module is further configured to intercept the existing graphic element sizing configuration in response to the target application receiving an initialization event.

28. The system of claim 21, wherein the interceptor module is further configured to intercept the existing graphic element sizing configuration in response to the target application receiving a resize event.

29. A system comprising:
one or more processors; and
a memory in communication with one or more processors, the memory containing instructions, that when executed by the one or more processors, cause the one or more processors to:
intercept from a target application an existing graphic element sizing configuration of one or more existing graphic elements displayed in the target application,
determine an injectable graphic element sizing configuration of one or more injectable graphic elements,
determine a resultant sizing configuration based upon the existing graphic element sizing configuration and the injectable graphic element sizing configuration, wherein the resultant sizing configuration permits the display of the one or more injectable graphic elements and the one or more existing graphic elements in the target application, apply the resultant sizing configuration to the one or more existing graphic elements, and inject the one or more injectable graphic elements into the target application using an application programming interface unrelated to the target application, wherein the injectable graphic elements are displayed in the target application.

* * * * *